United States Patent [19]
Harsch

[11] 3,719,331
[45] March 6, 1973

[54] DOWNRIGGER

[75] Inventor: Gerald J. Harsch, South Haven, Mich.

[73] Assignee: Harsch Precision Engineering, South Haven, Mich.

[22] Filed: June 30, 1971

[21] Appl. No.: 158,252

[52] U.S. Cl. ............... 242/106, 43/43.12, 242/86.5, 242/99
[51] Int. Cl. ............................................. B65h 17/52
[58] Field of Search ....242/106, 104, 86.5 A, 86.5 R, 242/84.5, 84.51, 84.1 A, 99; 43/43.12

[56] References Cited

UNITED STATES PATENTS

| | | | |
|---|---|---|---|
| 2,734,694 | 2/1956 | Davidson | 242/106 |
| 2,927,772 | 3/1960 | Kanouse | 242/106 |
| 2,786,296 | 3/1957 | Loebensteen | 43/43.12 |
| 3,295,787 | 1/1967 | Golonka | 242/106 X |
| 3,614,016 | 10/1971 | Rieth | 242/106 |

Primary Examiner—Stanley N. Gilreath
Assistant Examiner—John M. Jillions
Attorney—Woodhams, Blanchard & Flynn

[57] ABSTRACT

A downrigger for use in trolling. The downrigger has frame means releasably mounted on the watercraft. Shaft means are rotatably supported on the frame means and reel means are axially, slideably mounted on the shaft means and angularly fixed for rotation therewith. Drive means are provided and adapted to drive the shaft means for rotation to wind and unwind the line from the reel means. Brake means are provided which include an axially facing planar stationary surface on the frame means encircling the shaft means and an axially facing cooperating planar surface opposed to the stationary surface mounted on the reel means for rotation therewith. The brake means also includes actuating means for urging the cooperating surface in an axial direction into and out of an adjustable frictional engagement with the stationary surface for frictionally locking the reel means to the frame means under an adjustable amount of friction so that the tightness of the coupling between the stationary surface and the cooperating surface may be controlled and the coupling may be caused to slip when the line becomes snagged on an underwater object to thereby prevent the line from breaking.

14 Claims, 9 Drawing Figures

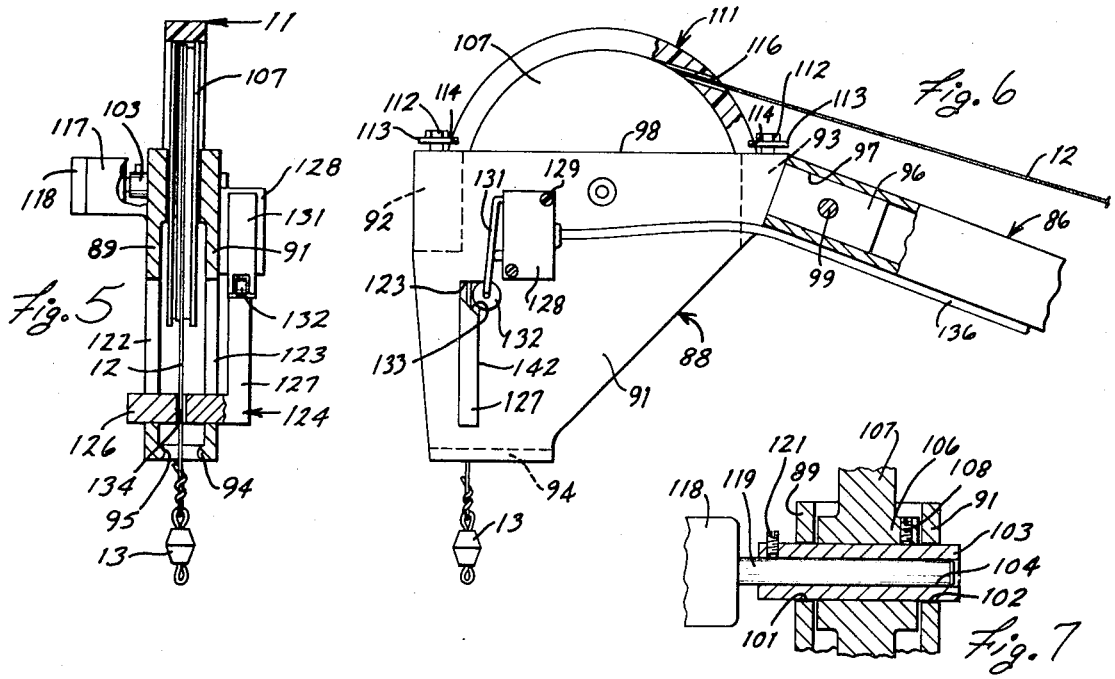
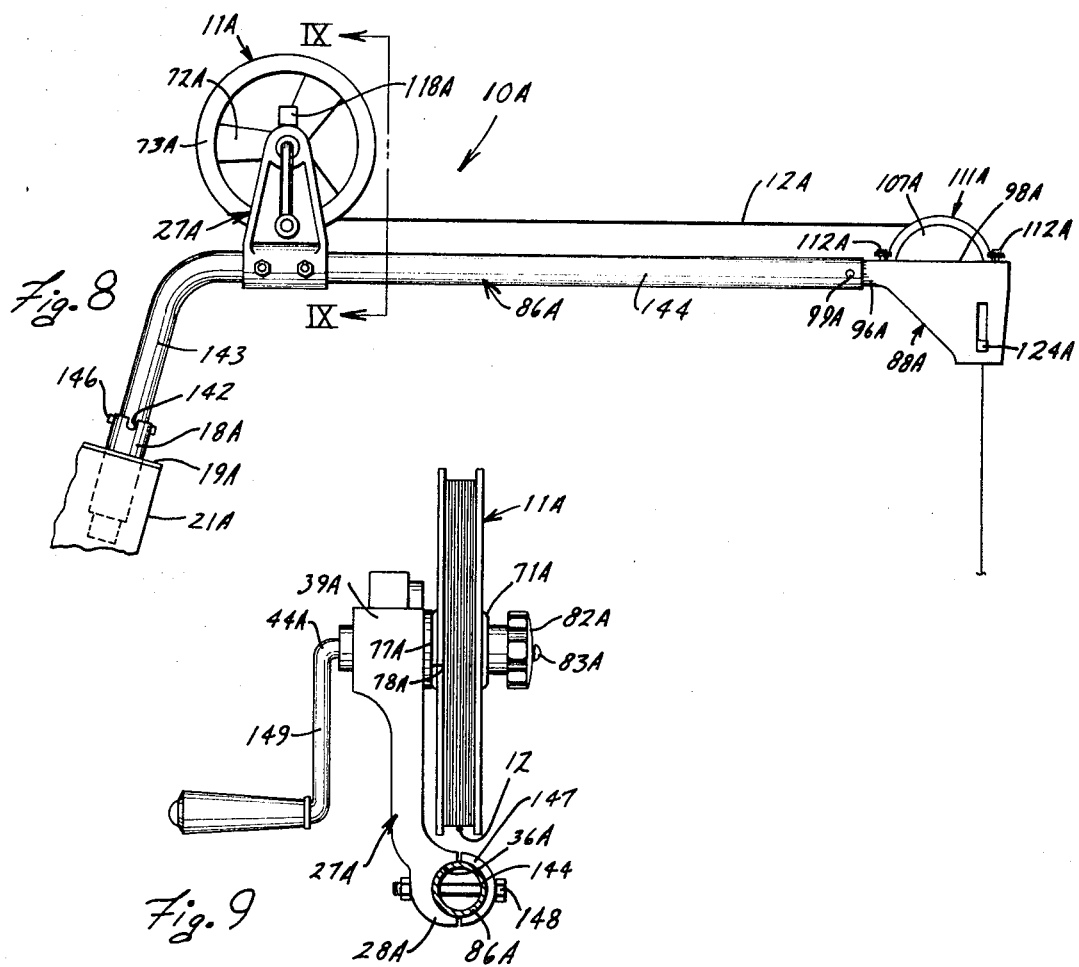

DOWNRIGGER

FIELD OF THE INVENTION

This invention relates to fishing tackle and, more particularly, to a downrigger for trolling where a sinker is employed to maintain the bait or lure at a desired depth below the surface of the water.

BACKGROUND OF THE INVENTION

It is conventional practice in deep trolling for various types of fish to employ a sinker which is attached to the fishing line through the medium of a sinker release. This release includes a spring latch mechanism and when a fish is hooked, the pull on the line or leader between the hook and the latch releases the latch and the sinker falls away so that the fish can be played and taken without the incumbering weight of the sinker on the line. One of the disadvantages of this practice is that the sinker is lost each time a fish is hooked, and many times when a fish bites without being hooked or when the hook becomes fouled with an underwater object. Another disadvantage is that relatively heavy tackle must be used to support the heavy sinker when lighter tackle is desired for playing the fish after the sinker is dropped.

Another type of release is the line release mechanism such that the sinker is supported by line wound on a separate reel so that when a fish is hooked on the line, the line will be released from the sinker and the sinker will remain supported and retrievable by the sinker line. However, the known devices of this general type are not entirely satisfactory, due to the provision of a brake which fixedly locks the reel so that same cannot rotate or slip even when the sinker line becomes snagged on an underwater object. As a result, the structure by which the reel is mounted to the watercraft can become damaged due to the large amount of stress applied to the structure of the watercraft when the sinker becomes snagged on an underwater object or the sinker line may break thereby inconveniencing the operator in having to add a new weight to the sinker line or replacing the sinker line with a new and longer supply of sinker line. Therefore, a downrigger which will minimize the occurrence of damage to the watercraft and/or the sinker line is highly desirable.

Accordingly, the objects of this invention are:

1. To provide an improved trolling tackle which includes a separate reel and line to carry a sinker, and means for attaching a conventional fishing line to the sinker in a manner to prevent release of the sinker from the fishing line while the sinker remains supported and retrievable by the sinker line.
2. To provide an improved trolling tackle, as aforesaid, which includes an axially engaging friction brake on a reel which is permitted to slip when a predetermined amount of tension is applied to the sinker line to thereby prevent the sinker line from breaking.
3. To provide an electric motor and an automatic shut-off therefor for reeling the sinker line in and for causing the motor to be shut off when the sinker line has been reeled in to the desired location.
4. To provide an improved trolling tackle, as aforesaid, wherein the frame means upon which the reel is mounted is quickly releasably mounted to the watercraft.
5. To provide an improved trolling tackle, as aforesaid, wherein a counter mechanism is provided to indicate the depth that the sinker is positioned beneath the surface of the water.
6. To provide an improved trolling tackle, as aforesaid, wherein the frame means upon which the reel is mounted is pivotal relative to the watercraft so that the free end of the boom may be moved to a position for convenient access thereto.
7. To provide an improved trolling tackle, as aforesaid, which is small and compact in size for easy handling and storing.
8. To provide an improved trolling tackle, as aforesaid, which can be easily operated with a minimum of instruction.

Other objects and purposes of this invention will become apparent to persons acquainted with trolling tackle of this general type on reading the following specification and inspecting the accompanying drawings, in which:

FIG. 5 is a sectional view taken along the line V—V of FIG. 2;

FIG. 6 is a side elevational view of the pulley mounted to the free end of the boom as indicated by the line VI—VI of FIG. 2;

FIG. 7 is a sectional view taken along the line VII—VII of FIG. 2;

FIG. 8 is a side elevational view of a modified downrigger; and

FIG. 9 is a sectional view taken along the line IX—IX of FIG. 8.

Figure 1:
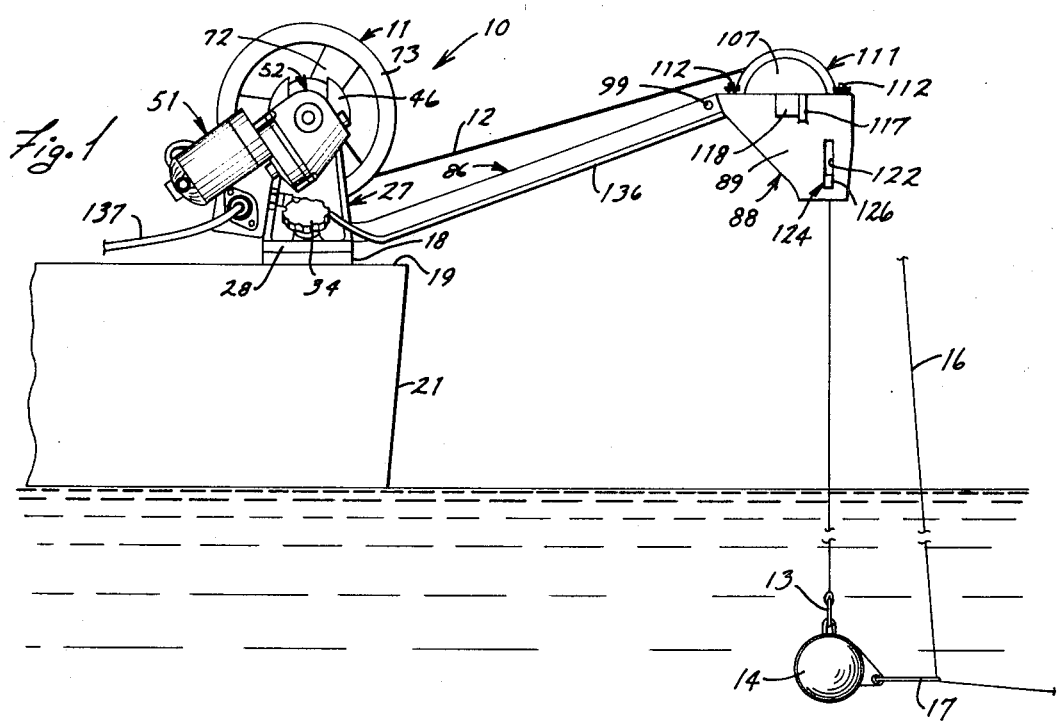
FIG. 1 is a side elevational view of a downrigger embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

SUMMARY OF THE INVENTION

The objects and purposes of the invention are met by providing a downrigger for use in trolling having frame means releasably mounted on a watercraft. Shaft means are rotatably supported on the frame means and reel means are axially slideably mounted on the shaft means and angularly fixed for rotation therewith. Drive means are adapted to drive the shaft means for rotation to wind and unwind the line from the reel means. Brake means including an axially facing planar stationary surface is provided on the frame means and encircles the shaft means. An axially facing, cooperating planar surface opposed to the stationary surface is mounted on the reel means for rotation therewith. Actuating means are provided for urging the cooperating surface in an axial direction into and out of an adjustable frictional engagement with the stationary surface for frictionally locking the reel means to the frame means under an adjustable amount of friction so that the tightness of the coupling between the stationary surface and the cooperating surface may be controlled.

DETAILED DESCRIPTION

Referring now to the drawings, FIG. 1 illustrates a downrigger 10 having a reel 11 for a sinker line 12 which has a clasp 13 on its end for engagement with a weight or sinker 14. A conventional pole and fishing reel (not illustrated) for containing a line 16 which leads from the not illustrated end of the pole is connected with a conventional line release mechanism 17. The line release mechanism 17 is also connected with the sinker 14. The end of the fishing line 16 may be provided with a conventional lure or bait not illustrated.

The downrigger 10 comprises a mounting base 18 (FIG. 3) which is fixedly secured to a generally horizontal surface 19 on a watercraft 21 by a plurality of screws 22 indicated in broken lines. The mounting base 18 has a flat upper surface and a dovetail groove 23 therein which extends generally perpendicular to the axis of the reel 11. An opening 24, inclined to the vertical in a direction away from the dovetail groove 23, is provided in the mounting base 18 at a location laterally spaced from the dovetail groove 23 and a nut 26 is fixedly secured in the opening 24.

The downrigger 10 further comprises a frame 27 having a base portion 28 having a flat surface 29 which is engageable with the upper surface of the mounting base 18. A projection 31 is provided on the base portion 28 of the frame 27 and is receivable in the dovetail groove 23. An opening 32 is provided in the base portion 28 and is adapted to receive a screwlike member 33 having a knob 34 secured to one end thereof. The screwlike member 33 is releasably threadedly engageable with the nut 26 to securely anchor the base portion 28 of the frame 27 to the mounting base 18. The opening 32 is inclined relative to the vertical in a direction away from the dovetail groove 23 so that when the screw 33 is threadedly engaged with the nut 26, the base portion 28 will cause the projection 31 to be urged into a firm engagement with the dovetail groove 23.

Figure 3:
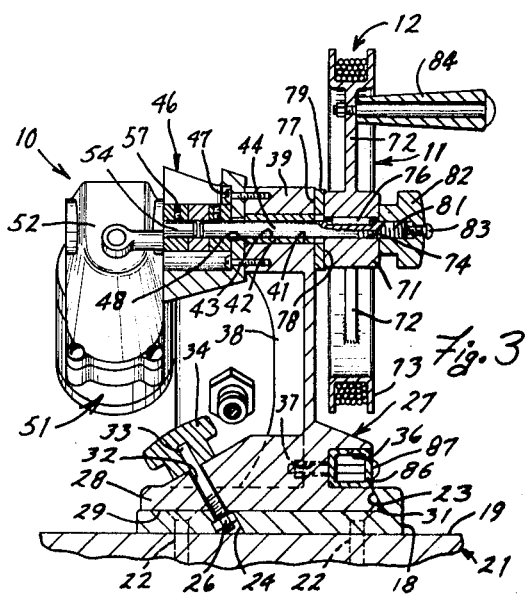
FIG. 3 is a sectional view taken along the line III—III of FIG. 2.

The base portion 28 of the frame 27 has an elongation slot 36 in one side thereof. A plurality of openings 37, only one of which is illustrated in broken lines in FIG. 3, is provided in the bottom of the slot 36.

The frame 27 further comprises an upstanding support portion 38 for supporting a hub 39 at the upper end thereof. An opening 41 is provided in the hub 39, the axis of which is generally parallel to the flat surface 29 on the base portion 28 of the frame 27 and perpendicular to the dovetail groove 23. A bushing 42 is mounted in the opening 41 and has an opening 43 centrally disposed therein. A shaft 44 is rotatably supported in the opening 43 of the bushing 42. The shaft 44 extends outwardly from the hub 39 at opposite longitudinal ends thereof.

A mounting bracket 46 is fixedly secured to the left side of the hub 39 (FIG. 3) by a plurality of screws 47.

The shaft 44 extends through an opening 48 and the bracket 46. A gear reducer 52 is secured to the bracket 46 by any convenient means, such as screws not illustrated. A reversible electric motor 51 is secured to the gear reducer 52 by a plurality of screws 53. The output shaft 54 of the gear reducer 52 is axially aligned with the shaft 44. A shaft coupling 56 is provided for coupling the output shaft 54 to the shaft 44. The shaft coupling 56 is of a conventional variety and a detailed discussion thereof is believed unnecessary. However, the set screw 57 which secures the shaft coupling 56 to the output shaft 54 is made readily convenient for access thereto so that the set screw 57 may be loosened to permit the shaft 44 to rotate relative to the output shaft 54 of the gear reducer 52.

Figure 4:
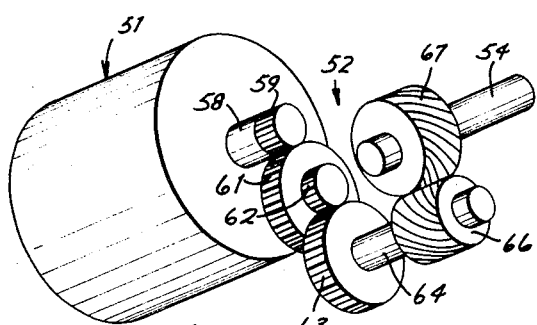
FIG. 4 is a perspective schematic illustration of the electric motor and gear reducer employed in the downrigger.

FIG. 4 illustrates schematically the gearing that is present in the gear reducer housing 52. More specifically, the output shaft 58 of the electric motor 51 has a gear 59 provided on the end thereof which is engageable with a spur gear 61. A smaller spur gear 62 is secured to the spur gear 61 and is rotatable therewith. A spur gear 63 is engageable with the spur gear 62 and is driven thereby. A shaft 64 having a worm 66 secured thereto is driven by the gear 63. The teeth on the worm 66 are spiral. A spiral gear 67 is engaged with the spiral worm 66 and drives the output shaft 54. The spiral gear arrangement of the worm 66 and the gear 67 permit the shaft 54 to receive an external angular force to cause same to rotate in a direction which is opposite to that which same is driven when the electric motor 51 is energized.

The reel 11 (FIG. 3) comprises a hub 71 having a plurality of weblike spokes 72 for securing the hub 71 to a rim 73 which is U-shaped in cross section. An opening 74 is provided in the hub 71 and has a keyway adapted to receive a key 76 which is secured to the shaft 44. The hub 71 is axially slideably disposed on the shaft 44 but angularly fixed to the shaft 44 by the key 76. The left surface 77 of the hub 71 cooperates with the right surface 78 of a disk 79 fixedly secured to the right surface of the hub 39.

The right end of the shaft 44 is provided with an external thread, as at 81 and a knob 82 is threadedly engaged with the threaded end 81. A rotation of the knob will urge the left surface 77 of the hub 71 axially of the shaft 44 into engagement with the surface 78 of the disk 79 to frictionally hold the reel in a fixed position. The head of a screw 83 secured to the right end of the shaft 44 serves to limit the amount that the knob 82 may be unscrewed from the threaded end 81 of the shaft 44. If desired, a spring, not illustrated, may be provided between the hub 39 and the hub 71 so that the surface 77 on the hub 71 will be urged away from the surface 78 on the disk 79 whenever the knob 82 is unscrewed to the limit position determined by the screw 83.

A handle 84 is secured to one of the weblike spokes 72 on the reel 11. The handle 84 serves to permit, if desired, a manual rotation of the reel 11 for the purpose of winding or unwinding line 12 therefrom.

A hollow, rectangularly-shaped boom 86 is received in the slot 36 of the frame 27 and is secured in position by a plurality of bolts 87 which are receivable through openings provided in the boom 86 and the openings 37 in the frame 27. The boom 86 is preferably radially aligned with the rim 73 of the reel 11 and extends rearwardly of the watercraft 21 as illustrated in FIG. 1. The boom 86 is also inclined upwardly relative to the horizontal as same extends rearwardly.

A pulley housing 88 (FIGS. 1, 5 and 6) is secured to the free end of the boom 86. More particularly, the pulley housing 88 comprises a pair of laterally spaced side plates 89 and 91 interconnected by cross connectors 92, 93 and 94, indicated in broken lines in FIG. 6. An opening 95 is provided in the cross connector 94. A plug 96 is secured to the right end (FIG. 6) of the pulley housing 88, particularly the cross connector 93. The longitudinal axis of the plug 96 is inclined relative to the horizontal so that when same is received in the opening 97 in the free end of the boom 86, the upper surface 98 of the pulley housing 88 will be generally horizontal. A pin 99 is provided for securing the plug 96 and, therefore, the pulley housing 88, to the boom 86.

Axially aligned openings 101 and 102 (FIG. 7) are provided in the side plates 89 and 91, respectively, and are adapted to rotatably support a sleeve 103 having an opening 104 therethrough. The hub 106 of a pulley 107 is mounted between the side plates 89 and 91 and is secured to the sleeve 103 by a set screw 108. Thus, the pulley 107 rotates about the axis of the sleeve 103.

A pulley line guard 111 (FIGS. 5 and 6) comprises a strip of arcuately shaped plastic, the radius of said arc being essentially identical to the radius of the pulley 107 and has a width which is substantially equal to the width of the pulley 107. The pulley guard strip 111 is mounted over the portion of the pulley 107 which extends above the surface 98 of the pulley housing 88 and is secured to the housing 88 by a plurality of screws 112 having washers 113 thereon receivable in notches 114 located adjacent the opposite ends of the pulley guard strip 111. An opening 116 is provided through the strip 111 so that the line 12 can pass therethrough and engage the pulley 107. Thus, the pulley guard strip 111 serves to prevent the line 12 from coming off of the pulley 107.

Figure 2:
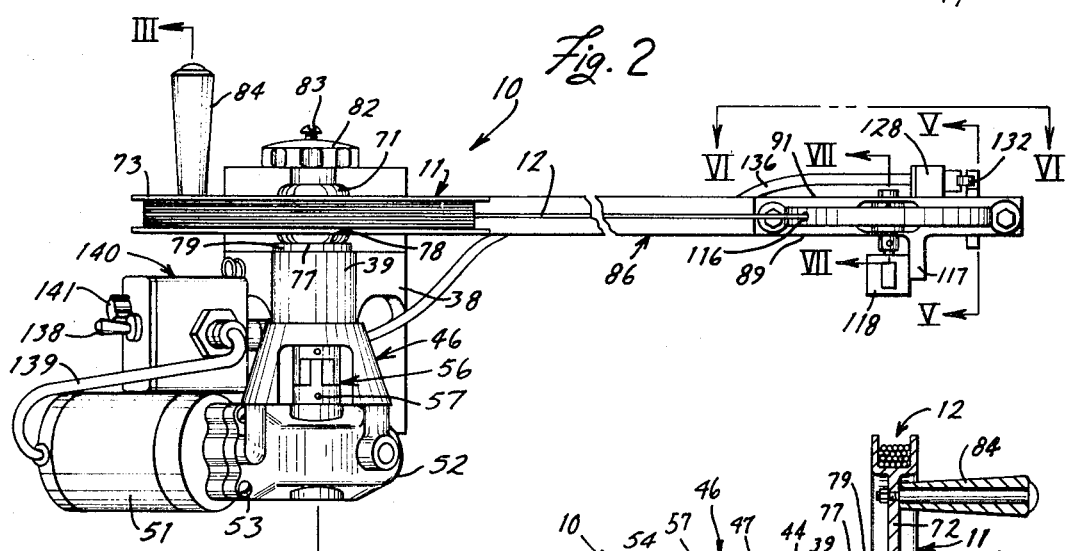
FIG. 2 is a top view of the downrigger.

A flange 117 is secured to the side plate 89 and extends outwardly therefrom. A counter device 118 (FIG. 7) having a rotatable input shaft 119 thereon, is mounted so that the shaft 119 is received in the opening 104 of the sleeve 103. A set screw 121 serves to secure the shaft 119 to the sleeve 103 so that a rotation of the pulley 107 will effect a rotation of the input shaft 119 to the counter device 118. The counter device 118 is mounted so that one surface thereof engages the flange 117 as indicated in FIG. 2. The flange 117 prevents a rotation of the counter device 118 so that a rotation of the input shaft 119 will effect a counting operation to indicate the amount of line that has passed over the pulley from a raised position wherein the weight 14 is above the surface of the water to the desired depth indicated by the counter device beneath the surface of the water.

A pair of axially aligned and elongated slots 122 and 123 are provided in the side plates 89 and 91, respectively. The length of the slots 122 and 123 is longer in the vertical direction than the horizontal width thereof. An L-shaped slider member 124 having a horizontal leg 126 and a vertical leg 127 is disposed so that the horizontal leg 126 is received by the axially aligned slots 122 and 123. The vertical leg 127 extends upwardly, parallel and closely adjacent the outside surface of the side plate 91.

A switching device 128 is secured to the side plate 91 by a plurality of screws 129 and has an actuating arm 131. A roller 132 is rotatably secured to the end of the actuating arm 131 and is positioned to engage the vertical arm 127 of the L-shaped slider member 124. A slanted surface 133 is provided on the upper end of the vertical leg 127 to facilitate a further engagement of the roller 132 on the actuating arm 131 of the switch 128.

An opening 134 is provided in the horizontal leg 126 of the slider member 124 and is adapted to receive the line 12 therethrough. While the opening 95 is large enough to permit passage of the clasp 13 therethrough, the clasp 13, however, is too large to pass through the opening 134. As a result, an upward movement of the clasp 13 will effect an upward movement of the slider member 124 within the slot 122 and 123 to effect an actuation of the switch 128.

The switch is interconnected with the motor 51 in a conventional manner through a line 136 to effect a deenergization of the motor 51 whenever the slider member 124 is moved upwardly to cause a movement of the actuating arm 131 of the switch 128. Accordingly, a detailed discussion of the specific electrical circuitry utilized to effect such an operation is considered not necessary.

OPERATION

While the operation of the downrigger device embodying the invention will be readily apparent to skilled persons from the foregoing discussion, a detailed discussion of the operation will be given below for convenience.

Electrical power is supplied to the motor 51 through a line 137 and switch 138 housed in a circuit containing box 140 which controls the power supplied through the line 139 to the electric motor 51. A conventional fuse 141 is provided in the box 140 to prevent damage to the wiring in the event of a short circuit. The switch 128 is mounted in series with the line 139 to the motor 51 to control the point at which the motor 51 becomes deenergized when the reel 11 is rotated to wind line 12 thereon.

Line 12 may be played out or reeled in by appropriate energization of the reversible electric motor 51. When the line 12 has been played out so that the sinker 14 is at the desired depth below the surface of the water indicated by the read-out portion on the counter device 118, the sinker 14 may thereafter be reeled in by energizing the electric motor 51 to cause the reel 11 to rotate in a clockwise direction (FIG. 1) to wind in the line 12 thereon. The pulley 107 will be caused to rotate in a direction to cause the counter device 118 to decrease in count to indicate the number of feet, for example, that the sinker 14 is positioned below the surface of the water. Since, in this particular embodiment, the perimeter of the pulley is 12 inches, one revolution of the pulley will register as a 1 foot indication on the read-out portion of the counter device 118. As a result, the number of feet indicated on the read-out portion of the counter device 118 will continue to decrease as the sinker 14 is raised from the depth beneath the surface of the water.

The motor 51 will continue to drive the reel 11 in the clockwise direction until the clasp 13 engages the slider member 124 to cause same to move vertically therewith so that the vertical arm 127 thereof engages the roller 132 on the actuating arm 131 of the switch 128 causing the motor 51 to be deenergized. The electric motor 51, however, will coast to a stop and the rollers 132 will ride along the surface 142 on the vertical leg 127 of the slider member 124. Thus, the electric motor 51 will become deenergized in time to prevent damage to the downrigger device.

After the sinker 14 has been raised to a position above the surface of the water, the operator may then wish to remove the downrigger device 10 from the watercraft. This is accomplished by rotating the knob 34 which effects a loosening of the screw 33 from the nut 26. As a result, the base portion 28 of the frame 27 is permitted to slide leftwardly (FIG. 3) so that the projection 31 is removed from the dovetail groove 23. The entire downrigger device 10 may then be manually picked up, if desired, and shifted to a position inside the watercraft for storage purposes. In order to install the downrigger device 10, a reverse of the above procedure is to be followed.

When the sinker 14 is positioned at the desired depth beneath the surface of the water, the knob 82 may be rotated to cause the surface 77 on the hub 71 to move axially along the shaft 44 into frictional engagement with the surface 78 on the disk 79. As a result, the reel 11 will be frictionally locked with the sinker 14 at the desired depth. If the sinker line 12 should become snagged on an underwater object while the watercraft 21 is moving, the tension developed on the line 12 will be sufficient to overcome the frictional engagement and cause the reel 11 to rotate to unwind line 12 therefrom to thereby prevent the line 12 from breaking or damaging the downrigger 10.

MODIFIED CONSTRUCTION (Figures 8 and 9)

A modified downrigger 10A, illustrated in FIG. 8, is generally similar to the downrigger 10 disclosed in FIGS. 1–6. Accordingly, the same reference numerals will be used to describe the downrigger 10A as was used to describe the downrigger 10, but the suffic "A" will be added thereto.

A modified hollow mounting base 18A is secured to the watercraft 21A, particularly the surface 19A thereof. The mounting base 18A comprises a hollow sleeve having a plurality of diametrically opposed notches 142 in the upper edge thereof. The hollow sleeve is open at both longitudinal ends.

An elongated L-shaped boom 86A having a vertical leg 143 and a generally horizontal leg 144 is provided and the leg 143 is received in the opening of the hollow mounting base 18A. A pin 146 is provided in the leg 143 and is adapted to be received in diametrically opposed notches 142 in the upper end of the mounting base 18A. Thus, the horizontal leg 144 may be pivoted about the axis of the leg 143 to any desired position. For example, the horizontal leg 144 may extend rearwardly of the watercraft 21A or the leg 144 may be pivoted to a position where same is essentially parallel with the rear of the watercraft 21A.

In this particular embodiment, the frame 27A comprises a recess 36A adapted to receive one side of the leg 144 of the boom 86A. A cap 147 is adapted to engage the opposite side of the leg 144 and a bolt 148 is adapted to draw the cap 147 into tight engagement with the leg 144 so that the leg 144 is essentially clamped between the frame 27A, particularly the base portion 28A thereof, and the cap 147.

A shaft 44A is rotatably supported in the hub 39A in a manner identical to that illustrated in FIG. 3. Accordingly, a further discussion thereof is believed unnecessary. However, a manually operable crank 149 is secured to the left end (FIG. 9) of the shaft 44A in place of the output shaft 54 from a gear reducer 52 as illustrated in FIG. 3. Thus, a manual operation of the crank 149 will effect a rotation of the shaft 44A to cause a winding or unwinding of the line 12 from the reel 11.

In this particular device, the length of the horizontal arm 144 of the boom 86A may be of a sufficient length to make the reading of the counter device 118 (FIG. 3) difficult if same were mounted in the same position as is disclosed in the embodiment illustrated in FIGS. 1 and 2. In this particular embodiment, however, the counter device 118A is mounted on the hub 39A of the frame 27A and is provided with appropriate gearing for causing the counter device to indicate the depth that the sinker 14 is located beneath the surface of the water in response to a rotation of the reel 11A.

A rotation of the knob 82A within the limits defined by the head of the screw 83A effects an engagement and disengagement of the surfaces 77A and 78A as was described above in connection with the embodiment illustrated in FIGS. 1–6. Accordingly, a further detailed discussion thereof is believed unnecessary.

The pulley housing 88A is identical to the pulley housing 88 except that the plug 96A extends in a direction parallel with the upper surface 98A of the pulley housing 88A. Thus the line 12A, which extends between the pulley 107A and the sinker, will pass through the center of the opening in the pulley housing 88A (corresponding to the opening 95 in FIG. 5) when the sinker is located generally directly below the pulley 107A. The plug 96A is secured to the leg 144 of the boom 86A by a pin 99A.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A downrigger for use on watercraft for trolling, the combination comprising:
   frame means releasably mounted on said watercraft;
   shaft means rotatably supported on said frame means;
   reel means axially, slideably mounted on said shaft means and angularly fixed for rotation therewith;
   drive means adapted to drive said shaft means for rotation to wind and unwind a line from said reel means;
   brake means including an axially facing planar stationary surface on said frame means and an axially facing cooperating planar surface opposed to said stationary surface mounted on said reel means for rotation therewith, said brake means further including actuating means for urging said cooperating surface axially of said shaft means into and out of an adjustable and frictional engagement with said stationary surface for frictionally locking said reel means to said frame means under an adjustable amount of friction whereby the tightness of the coupling between said stationary surface and said cooperating surface may be controlled so that said coupling may be caused to slip when said line becomes snagged on an underwater object to thereby prevent said line from breaking.

2. A downrigger according to claim 1, wherein said drive means includes an electric motor and gear reducer means, the output shaft of said gear reducer means being connected to said shaft means, said gear reducer means including gear means for permitting said output shaft to be manually rotated in reel winding and unwinding rotational directions so that when said line becomes snagged on an underwater object, said brake means will slip and said shaft means will be permitted to rotate in said reel unwinding direction. shaft means will be permitted to rotate in said reel unwinding direction.

3. A downrigger according to claim 1 including mounting platform means secured to said watercraft, said mounting platform means having ridge means and first coupling means spaced therefrom; and wherein said frame means includes projection means engageable with said ridge means and second coupling means releasably engageable with said first coupling means for holding said projection means in engagement with said ridge means to thereby hold said frame means on said mounting platform means.

4. A downrigger according to claim 1 including means defining a boom secured to and extending away from said frame means and having pulley means mounted adjacent the free end thereof, said pulley means being generally radially aligned with said reel means, said line engaging said pulley means to guide same from said reel means.

5. A downrigger according to claim 4, wherein said pulley means includes housing means releasably securable with said free end of said boom means.

6. A downrigger according to claim 4, wherein said pulley means comprises a line guiding pulley rotatably supported on a support means on said boom and pulley guard means for preventing said line from coming off said pulley means.

7. A downrigger according to claim 4, wherein said pulley means includes housing means secured to said free end of said boom means and having a shaft rotatably mounted therein, a pulley secured to said shaft and being rotatable therewith, and means on said housing means slideably engaging the periphery of said pulley to thereby prevent said line from coming off said pulley.

8. A downrigger according to claim 4, wherein said pulley means includes housing means secured to said free end of said boom means and having a shaft rotatably mounted thereon, a pulley secured to said shaft and being rotatable therewith; and including counter means secured to said pulley and responsive to a rotational movement thereof to indicate the amount of line played out from said reel means, the diameter of said pulley corresponding to an increment of measurement displayed on said counter means.

9. A downrigger according to claim 1, wherein said drive means includes a motor and a motor driven output shaft connected to said shaft means; and including switching means adjacent said pulley means and connected in circuit with said motor, said switching means being responsive to the movement of an object secured to said line, a movement of said reel means in said winding direction causing said object to switch said switching means to deenergize said motor.

10. A downrigger according to claim 9 including releasable connecting means for connecting said motor driven output shaft to said shaft means.

11. A downrigger according to claim 1 including mounting means secured to said watercraft and means for pivotally securing said frame means to said mounting means.

12. A downrigger according to claim 11 including pulley means secured to said frame means.

13. A downrigger according to claim 12 including counter means mounted on said frame means and responsive to a rotational movement of said shaft means.

14. A downrigger according to claim 13, wherein said frame means includes an elongated L-shaped bar having one leg extending generally horizontally away from said reel means and a vertical leg engaging said mounting means, said horizontal bar being pivotable at least 180° about the axis of said vertical bar while simultaneously permitting said release from said mounting means.

* * * * *